US008249960B2

(12) United States Patent
Cooper et al.

(10) Patent No.: US 8,249,960 B2
(45) Date of Patent: Aug. 21, 2012

(54) SYSTEM AND METHOD TO PROVIDE REAL TIME TRANSACTION VALIDATION AND BILLING VIA A COMMUNICATIONS NETWORK

(75) Inventors: Dave M. L. Cooper, Calgary (CA); Dennis Woronuk, Calgary (CA); Robert S. Woodward, Calgary (CA); Kevin G. Zeeb, Calgary (CA); Thomas Joseph Mullen, Calgary (CA)

(73) Assignee: Wmode Inc., Calgary (CA)

( * ) Notice: Subject to any disclaimer, the term of this patent is extended or adjusted under 35 U.S.C. 154(b) by 1324 days.

(21) Appl. No.: 10/433,675

(22) PCT Filed: Dec. 6, 2001

(86) PCT No.: PCT/CA01/01727
§ 371 (c)(1),
(2), (4) Date: Oct. 20, 2003

(87) PCT Pub. No.: WO02/46954
PCT Pub. Date: Jun. 13, 2002

(65) Prior Publication Data
US 2004/0068473 A1     Apr. 8, 2004

(30) Foreign Application Priority Data
Dec. 8, 2000  (CA) ..................................... 2327935

(51) Int. Cl.
*G07F 19/00*     (2006.01)
(52) U.S. Cl. ....................................................... 705/34
(58) Field of Classification Search ...................... 705/34
See application file for complete search history.

(56) References Cited

U.S. PATENT DOCUMENTS

| 4,823,264 | A | | 4/1989 | Deming |
| 5,267,149 | A | | 11/1993 | Anada et al. |
| 5,329,589 | A | | 7/1994 | Fraser et al. |
| 5,475,585 | A | | 12/1995 | Bush |
| 5,479,510 | A | | 12/1995 | Olsen et al. |
| 5,485,510 | A | | 1/1996 | Colbert |
| 5,677,955 | A | | 10/1997 | Doggett et al. |
| 5,692,132 | A | * | 11/1997 | Hogan ............................ 705/27 |
| 5,715,314 | A | | 2/1998 | Payne et al. |
| 5,715,397 | A | | 2/1998 | Ogawa et al. |
| 5,717,989 | A | | 2/1998 | Tozzoli et al. |
| 5,724,412 | A | | 3/1998 | Srinivasan |
| 5,724,424 | A | | 3/1998 | Gifford |
| 5,727,163 | A | | 3/1998 | Bezos |
| 5,757,917 | A | | 5/1998 | Rose et al. |
| 5,825,881 | A | | 10/1998 | Colvin, Sr. |

(Continued)

FOREIGN PATENT DOCUMENTS
CA         2263777        3/1999
(Continued)

*Primary Examiner* — Russell S Glass
(74) *Attorney, Agent, or Firm* — Bennett Jones LLP (57) ABSTRACT

A system and method for providing real-time validation to a content provider of a customer's request transmitted via a communications system for delivery of content by the content provider to the customer via a communications system. A request for validation of the customer from the content provider, the request including data identifying the customer, is dealt with by determining from the identifying data whether the customer is a subscriber and then immediately requesting acknowledgement by the customer of the customer's request for the delivery of the content. Upon receipt of an acknowledgement from the customer a validation of the customer's request is sent to the content provider.

22 Claims, 4 Drawing Sheets

U.S. PATENT DOCUMENTS

| | | | |
|---|---|---|---|
| 5,852,812 A | | 12/1998 | Reeder |
| 5,878,141 A | * | 3/1999 | Daly et al. .................. 705/78 |
| 5,890,137 A | | 3/1999 | Koreeda |
| 5,903,878 A | | 5/1999 | Talati et al. |
| 5,905,736 A | * | 5/1999 | Ronen et al. .................. 370/546 |
| 5,987,140 A | | 11/1999 | Rowney et al. |
| 6,012,144 A | | 1/2000 | Pickett |
| 6,088,683 A | | 7/2000 | Jalili |
| 6,088,717 A | | 7/2000 | Reed et al. |
| 6,125,352 A | | 9/2000 | Franklin et al. |
| 6,178,409 B1 | | 1/2001 | Weber et al. |
| 6,980,970 B2 | * | 12/2005 | Krueger et al. .................. 705/39 |
| 2002/0194138 A1 | | 12/2002 | Dominguez et al. |

FOREIGN PATENT DOCUMENTS

| | | |
|---|---|---|
| WO | WO 96/42041 | 12/1996 |
| WO | WO 00/46681 | 8/2000 |

* cited by examiner

SYSTEM AND METHOD TO PROVIDE REAL TIME TRANSACTION VALIDATION AND BILLING VIA A COMMUNICATIONS NETWORK

FIELD OF THE INVENTION

The present invention relates to the billing and validation of transactions carried out via a communications network, and in particular, to the billing and validation of such transactions in which content may be delivered immediately via the communications network.

BACKGROUND OF THE INVENTION

The development of electronic commerce has to date relied generally upon the use of validation systems that predate the Internet and cellular telephones capable of digital data communication. For example, the purchase of software downloadable via the Internet has been possible for some time, but it is normally carried out using charge accounts. The customer selects software for purchase and provides a charge card number and other information to the software vendor via a secure encrypted connection. The software vendor then contacts the credit company by way of a separate channel using a digital protocol, and requests verification of the information that the customer provided. If all of the information is in order the credit company authorizes and guarantees the sale. Thus the vendor obtains validation from the credit company and allows the download to proceed.

Credit companies usually charge a percentage of the purchase price for their services. For this reason, the current systems for purchase of content via the Internet or other communications networks are in general not well suited to small purchases ("micro-payments") of, for example, less than a few dollars. An exception to this is the model used by telephone carriers for providing services such as directory assistance for a small charge and by the iMode cellular network system provided by NTT DoCoMo in Japan. In each case, the carrier itself either is the content provider (in the case of telephone carriers) or deals with the content providers (in the case of iMode) and provides the content directly to the user. While the iMode business model works for small amounts of data provided at low prices, it does not appear to be of interest to telephone carriers in North America, possibly due to the need to deal with a multitude of content providers.

A need exists for a method and system for validation of requests by customers for electronic content that (1) does not involve the validation service provider in the handling of large amounts of data representing the content and (2) is able to handle a variety of payment methods, including subscriptions, prepaid accounts, and micro-payments for content in a cost efficient manner for a large number of content providers.

SUMMARY OF THE INVENTION

The inventive method and system provides real-time validation to a content provider of a customer's request, transmitted via a communications network, for delivery of content by the content provider to the customer, which delivery may be via the same communications network or other means. The inventive method includes (1) receiving a request for validation of a customer from the content provider, the request including data identifying the customer, (2) determining from the identifying data whether the customer is a subscriber, and (3) verifying that the customer request for service is not fraudulent, through direct contact with the customer or other means.

"Real-time" herein shall mean in a time comparable or less than the time typically needed for a merchant to obtain validation of a credit card or debit card transaction.

The request for validation may include data identifying at least one characteristic of the content requested by the customer, such as the charge to be paid by the customer for the content. If the customer's request is acknowledged and validation is sent to the content provider, then the charge to be paid is stored for later aggregation and billing to either the customer's account with the carrier of the communications system, the customer's charge account, or the customer's prepaid account.

Further, the system can employ the use of digital signatures as part of the customer authorization of the transaction. The approval may be on a transaction originated by the content provider or on a transaction originated by the system. The digital signature of electronic documents may not require a payment transaction.

Customers may have temporary identification data assigned to them by the communications system. The temporary identification data could be translated into a billing identity by the validation system so as to keep the customer's identity secret.

Private or public key encryption methods may be used to verify the customer identity.

DETAILED DESCRIPTION

Figure 1:
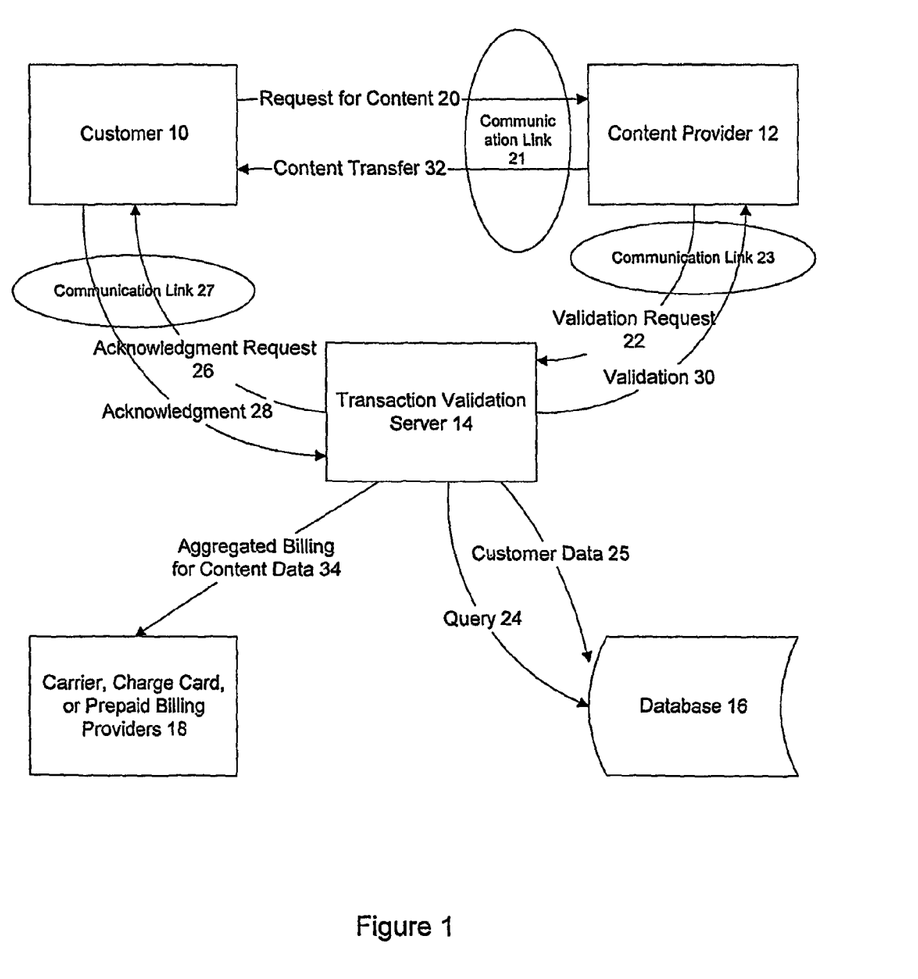
FIG. 1 is a block diagram illustrating the flow of data in a transaction validation and billing system embodying the present invention.

The overall flow of data in the real-time transaction validation and billing system is illustrated in FIG. 1. A customer 10 has decided to purchase content from a content provider 12. The system provides a transaction validation server 14 and a database 16, which interact with customer 10 and content provider 12 to validate a customer's request for content 20. The server 14 also provides billing information to credit or prepaid service providers 18.

More specifically, the customer 10 sends a request for content 20 to the content provider 12 via a communications link 21. The content requested may be electronic, such as an audio or video file, a software program, or a key to unlock a file or program on a storage medium such as a CD-ROM. While the system is primarily addressed to the problem of providing real time validation of the delivery of electronic content, it may also be used for the validation of transactions involving the physical delivery of goods or the provision of services, particularly transactions involving "micro-payments". For example, the "content" might be an item from a vending machine. Hence, "content" herein should be read widely to include anything that can be the subject of a commercial transaction. The delivery of content is indicated by reference numeral 32 in FIG. 1 and is shown as taking place via the communications link 21, but it should be kept in mind that the content could be delivered in some manner other than the communication link 21 used by the customer 10 to make the request 20.

The content provider 12, upon receiving a request for content 20 from the customer 10, in turn sends a request for validation 22 to the transaction validation server 14 via a second communications link 23, which may be the same or a different form of communication from that used by the customer 10 to request the content. The validation request 22 includes data identifying the customer 10 and may include other data identifying the content. The identifying data may be an identifier embedded in the validation request 22 that is unique to customer 10. Suitable applets, custom software or application plug-ins may be required to facilitate the transmission of the appropriate identifier by the content provider 12 to the transaction validation server 14. The validation request 22 may also include a price to be charged for the content.

The transaction validation server 14, upon receipt of the validation request 22, sends a query 24 to the database 16 to obtain customer data 25, including records of what arrangements, if any, the customer 10 has made to pay for the content requested. Such arrangements may include purchase of a prepaid billing plan or subscription, arrangements with the provider ("the carrier" herein) of the communications link 21 or an agreement to pay by a credit card account. The database 16 may also include purchase quantity or cost limits specified by the customer 10 in advance. The database 16 may also include historical data regarding previous validation requests and address data necessary for the transaction validation server 14 to send an immediate acknowledgement request 26 to the customer 10.

The transaction validation server 14, assuming that the customer 10 is found in the subscription database 16 and is in good standing, then checks whether it is necessary to send an acknowledgment request 26 to the customer 10, as this requirement may be waived by some customers in predefined circumstances, or to some third party. If such a request is necessary the transaction validation server 14 sends the acknowledgment request 26 to the customer 10, or the third party, via a third communications link 27, which may be the same as the communication link 21 used to communicate the request for content 20. If the customer 10 or third party confirms the request for content 20 by sending an acknowledgment 28 back to the transaction validation server 14, then the transaction validation server 14 in turn sends a validation 30 to the content provider 12 over the second communication link 23. The content provider 12 then in turn transfers 32 the content to the customer 10. As discussed above, transfer 32 could include physical delivery of the content as well as electronic delivery via a communications network.

Preferably, the transaction validation server 14 also provides for billing the charges for each transfer of content 32 to the customer 10, although the content provider 12 could instead take care of the billing itself. A number of methods may be provided for doing so. For example, as shown in FIG. 1, the transaction validation server 14 may send aggregated billing for content data 34 to a carrier, a charge card system such as VISA™, or a prepaid billing system. Alternatively, the customer 10 may have prepaid for transfers of content 32. All three alternatives are represented by the block labeled with reference numeral 18 in FIG. 1.

An advantage of the inventive method is that many small charges may be aggregated and billed at one time. A further advantage is that the transaction validation server 14 does not handle the transfer of content 32. The transaction validation server 14 does not necessarily need to know what the content is, so long as the price to be charged is determinable and the customer 10 acknowledges the acknowledgment request 26, as per the pre-arranged method. Not only does the transfer of the content 32 not place a strain on the transaction validation server 14, but also the privacy of the customer 10 and the content provider 12 is maintained. In prior validation methods known to the inventors the content flows through a transaction server, requiring close involvement of the operator of the transaction server with the content provider.

A further advantage of the inventive system and method is that the customer 10 may not need to enter any identification or password when requesting delivery of content. For example, when communication link 21 is a wireless Internet system, the customer 10 is identified by the wireless device used.

Figure 1A:
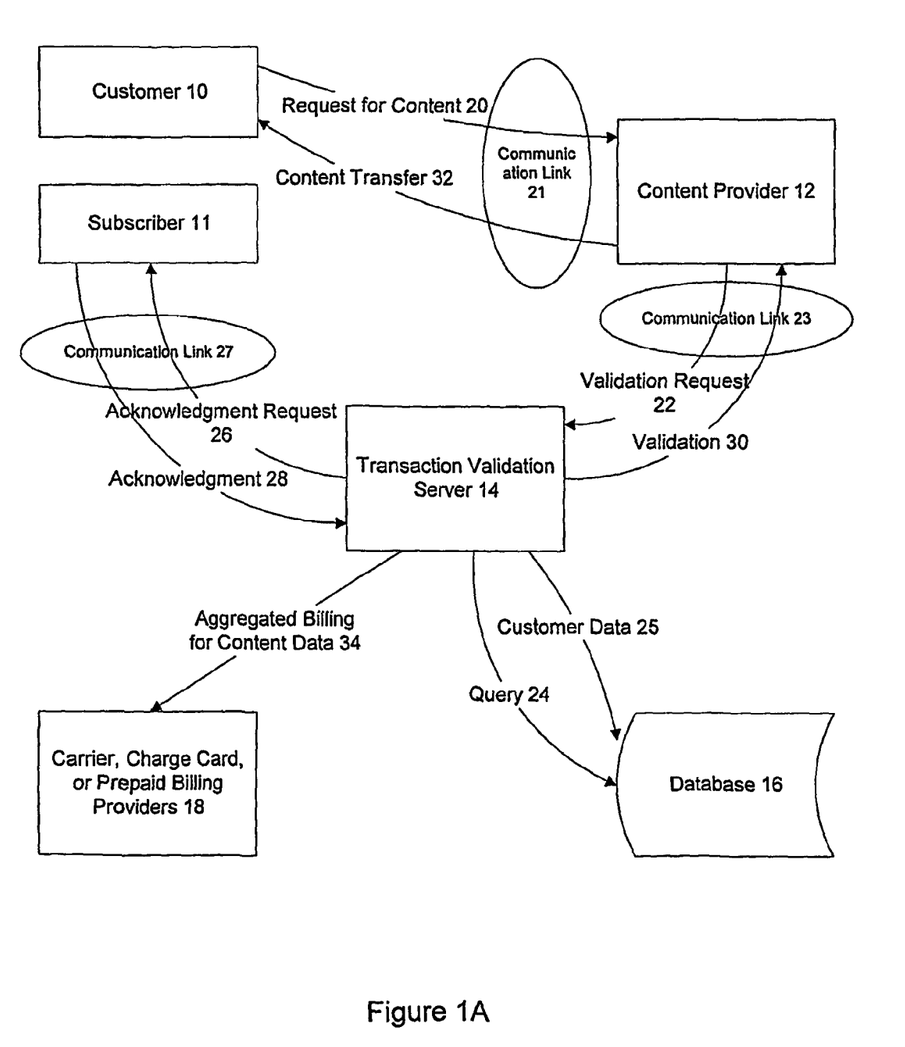

In the system described in relation to FIG. 1, to simplify the description it has been assumed that the person initiating the request for content 20 is the same person who has the responsibility for paying the charges for the content. In most cases that person will be a subscriber to a carrier that makes use of the validation and billing system described herein. However, there is no reason that the person initiating the request for content 20 must be a subscriber. Suppose that a subscriber's child is the customer 10 and is with the permission of the subscriber operating a cellular telephone with digital data communication capabilities. This situation is illustrated in FIG. 1A, which differs from FIG. 1 only in that the acknowledgement request 26 is sent out by the transaction validation server 14 to the subscriber, indicated by reference numeral 11, rather than to the customer 10, and the subscriber 11 replies with the acknowledgement 28, assuming that the subscriber 11 authorizes the content transfer 32. The content provider 12 and the transaction validation server 14 have no way of know whether the customer 10 and the subscriber 11 are the same person or not.

Figure 2:
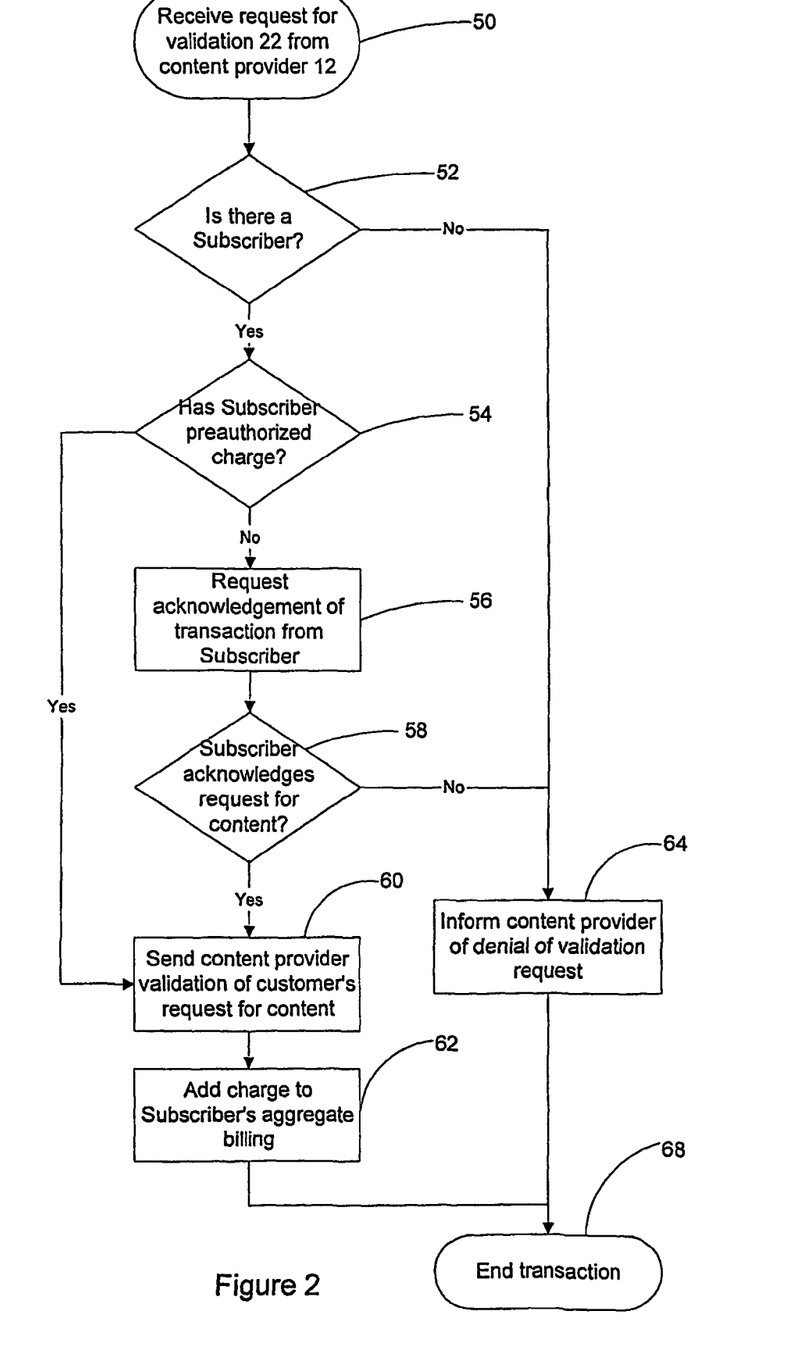
FIG. 2 is a flowchart of a transaction validation and billing system embodying the present invention.

A high level flowchart of the process employed by an embodiment of the transaction validation system of FIG. 1A that could be run on server 14 to provide real time transaction validation and billing as described above is shown in FIG. 2. The process begins at block 50 by receipt by the transaction validation server 14 of a request 22 from a content provider 12 for validation of a customer's request for content 20. The request for content will include some identification of the source of the request for content 20. For example, the identification might be the unique hardware identifier of a digital cellular telephone, which is automatically sent whenever the cellular telephone is used. At block 52, the transaction validation server 14 verifies that the identification included in the request for content 20 matches that of a subscriber 11. Note that matching at this stage does not mean that the request for content is valid and authorized by the subscriber 11 as the cellular telephone could be stolen or the customer 10, who might not be the subscriber, could be attempting to obtain content that the subscriber 11 has not authorized. If there is no match at block 52, control passes to block 64, at which the content provider 12 is informed of the denial of the validation request 22. If there is a match at block 52, the transaction validation server 14 at block 54 checks to see if the subscriber 11 has preauthorized the charge for the content requested. If the subscriber 11 has not, the transaction validation server 14 at block 56 sends an acknowledgement request 26 to the subscriber 11. At block 58, if a response to the acknowledgement request 26 is received back in which acknowledgement is refused, or after some predetermined time limit, control is transferred to block 64 at which the content provider 12 is informed of the denial of the validation request 22. If the subscriber 11 acknowledges the request for content 20 within the time limit by returning an acknowledgement 28, then control is transferred to block 60 at which the transaction validation server 14 sends a validation 30 to the content provider 12. If the subscriber 11 was found at block 54 to have preauthorized the charge for the content requested, then control also passes to block 60 at which the transaction validation server 14 sends a validation 30 to the content provider 12. Following execution of block 60, control passes to block 62 at which the charge for the content requested is added to an aggregate of charges for the subscriber 11. Finally, the transaction validation process ends at block 68 following either the execution of block 62 or block 64.

Figure 3:
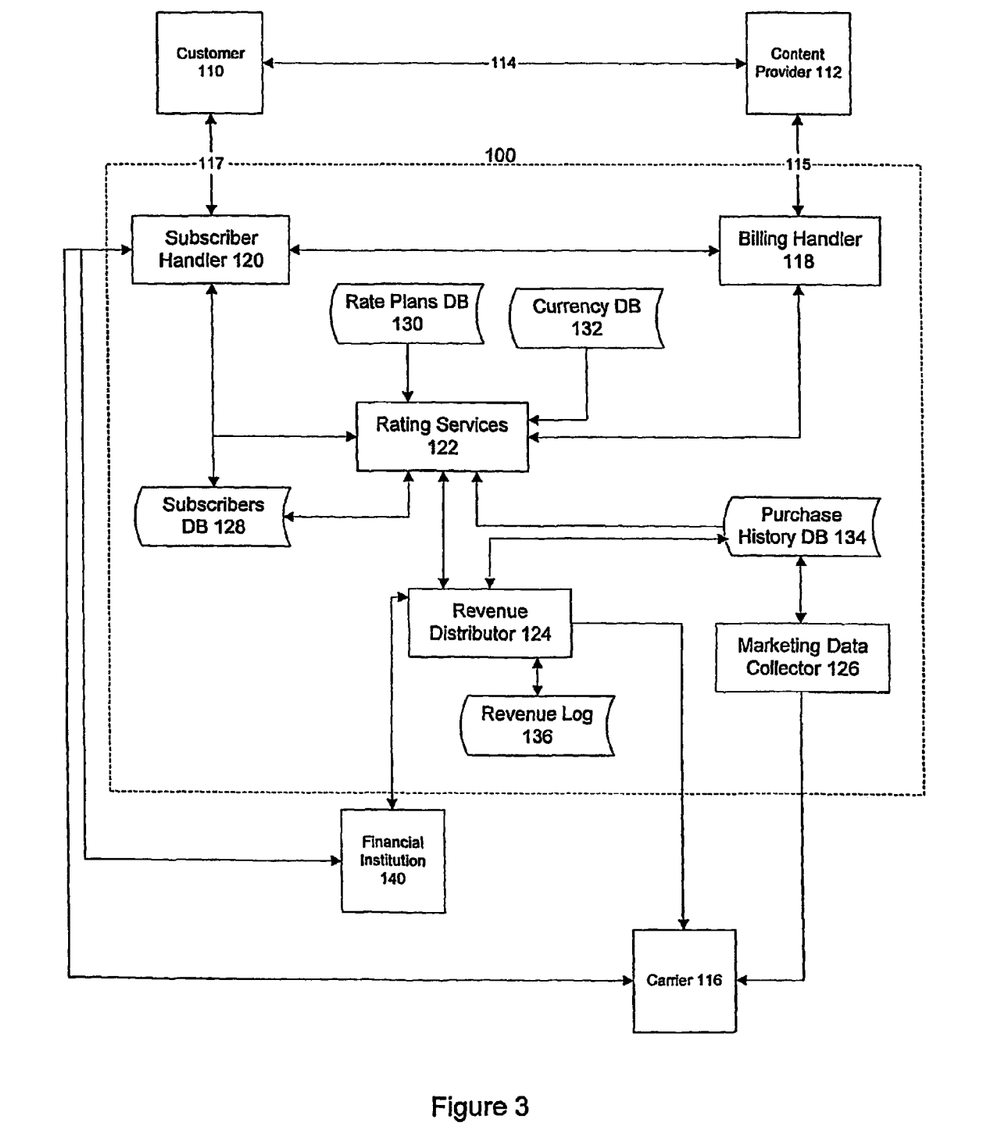
FIG. 3 is more detailed depiction of the software abstractions of a transaction validation and billing system embodying the present invention.

FIG. 3 shows in more detail the software abstractions of an exemplary real-time validation and billing system, collectively referred to by reference numeral 100, which could implement core functions of the transaction validation server 14 and database 16 and is the presently preferred embodiment of a real-time validation and billing system. In effect, FIG. 3 is representation of how the system shown in simplified form in FIG. 1 could be implemented. Each abstraction represents a process running on one or more computers or a database or portion of a database resident on one or more computers. For example, each database abstraction may represent a table or a set of tables of a single database structure and each process may be part of a single program running on a single computer.

In FIG. 3, communication between a customer 110 and the content provider 112 is assumed to be via a communications system 114. The communications system 114 could be the Internet or a service provided by a carrier. For the purposes of this example, it is assumed that the customer 110 is a subscriber to a wireless communications system 114 operated by a carrier. The carrier's data processing facilities are represented in FIG. 3 by block 116 and include at least the capability of providing updated lists of the subscribers to the communications system 114. Communication between the content provider 112 and the system 100 is via a second communication system 115, which should preferably be a private network for security. Communication between the system 100 and the customer 110 is via a third communication system 117, which may utilize system 114. For example, such communication may involve "tunneling" back through communications system 115 and communication system 114.

To further clarify the flow of data in the transaction validation system, the transaction validation server 14 in FIG. 1 is represented in FIG. 3 as several processes: a real-time billing handler 118; a subscriber handler 120; a rating services handler 122; a revenue distributor 124; and a marketing data collector 126. Likewise, the database 16 of FIG. 1 is represented as several databases in FIG. 3:

(1) a subscriber database 128, containing data on each subscriber, which may include identification of a rate plan selected by the subscriber, a desired currency for charges to the subscriber, and directions as to the conditions under which the subscriber will be asked to confirm transactions;

(2) a rate plans database 130, containing definitions of rate plans that may be selected by subscribers and may include methods for calculating the price to be charged for the content;

(3) a currency database 132, containing current exchange rates;

(4) a purchase history database 134, containing records of all transactions completed by the subscribers and content providers; and (5) a revenue log database 136, containing a record of revenue attributed to the transaction validation service.

Block 18 of FIG. 1, which represents the carrier, charge card company, or prepaid billing company has been expanded in FIG. 3 into two blocks: the carrier 116 and a financial institution 140, which may be a wallet or credit company, prepaid company, or a bank.

Data flows in the system 100 are now described. Upon receipt of a request for content from the customer 110 via communication system 114, the content provider 112 sends a query via communication system 115 containing data identifying the customer 110 and the content requested to the real-time billing handler 118 asking for validation of the customer's request for content. The real-time billing handler 118 creates a transaction object containing at least the data received from the content provider 112 and in turn sends a query to the subscriber handler 120 referencing the transaction object.

Using the customer identification data in the transaction object, the subscriber handler 120 queries the subscriber database 128 to determine whether there is a current subscriber whose customer identification data matches that received by the real-time billing handler 118 from the content provider 112. If no match is found in the subscriber database 128, the subscriber handler 120 checks the carrier's data processing system 116 to determine whether the customer 110 is a current subscriber. This determination may optionally be done even if the customer 110 is found in the subscriber database 128 or may be done in lieu of checking subscriber database 128.

If the customer 110 is determined to be a subscriber to the communication system 114 provided by the carrier 116, then the subscriber handler 120 will ask the rating services handler 122 for the price to be charged for the content requested by the customer 110. The rating services handler 122, using the data contained in the transaction object, queries the subscriber database 128, to determine which rate plan should be applied to the transaction, the rate plan database 130 to determine a price to be charged for the requested content based upon the rate plan to be applied and the identification of the content, and the currency database 132 for the proper exchange rate, if any, to be applied to the price so as to calculate the price in the preferred currency of the customer 110. The rating services handler 122 reports the price for the transaction back to the subscriber handler 120.

The subscriber handler 120 then, if the data found in the subscriber database 128 indicates that the price is to be charged to the customer's account with the financial institution 140, may seek preauthorization from the financial institution 140. If preauthorization is refused, the subscriber handler 120 reports back to the real-time billing handler 118, which in turn reports to the content provider 112 and closes the transaction.

If no preauthorization is required or if preauthorization is given by the financial institution 140, the subscriber handler 120 communicates the final price to the customer 110 as part of an acknowledgment request sent via communications system 117 and then waits for an acknowledgment from the customer 10. If the subscription database 128 contains special instructions regarding acknowledgment, then the acknowledgment request will instead be directed to a third party or the transaction automatically confirmed or rejected based upon customer-defined price thresholds. When a decision is reached, the subscriber handler 120 responds accordingly to the real-time billing handler 118. The real-time billing handler 118 then informs the content provider 112 as to the decision (shown in FIG. 1 as a validation 30).

If the content provider 110 receives validation from the real-time billing handler 118, then the content provider 110 commences providing the content. When the content provider has finished providing the content, it sends a service complete message to the real-time billing handler 118. This informs the real-time billing handler 118 to close the transaction and report to the rating services handler 122 that the transaction is closed. If the content is to be provided over an extended period in response to separate requests for content from the customer 110, e.g., the content is a subscription to a service that provides updated information for a specified time period for a fixed total fee, then the transaction is kept open and on receipt of validation requests from the content provider 112, the billing handler 118 may only ask the subscriber handler 120 to confirm that the customer 110 remains in the subscriber database 128. No acknowledgment may be needed from the customer 110.

When a transaction is finally completed by the receipt of a service complete message, the billing handler 118 notifies the rating services handler 122, which in turn closes transaction object and the passes data regarding the transaction on to a revenue distributor handler 124. The data passed to the revenue distributor handler 124 may include data from the rate plans database 130, the currency database 132, and the purchase history database 134 in addition to the details of the transaction just closed. The revenue distributor handler 124 stores the details of the just closed transaction in the purchase history database 134 and determines which method was chosen by the customer 110 for payment based on information from the rating services handler 122. Depending upon the payment method chosen, the revenue distributor handler 124 sends the appropriate data on to the financial institution 140 or the carrier 116. Finally, a log is made of the revenue to be attributed towards the operation of the system 100 by storing appropriate data in revenue log database 136.

Subscribers may be provided with means for reviewing transactions and options such as redirecting acknowledgment requests to a device other than that from which a request for content 20 originated. For example, the subscriber may be a parent and the customer 110 at a given time may be the parent's child. In that case, the subscriber may wish to have acknowledgment requests 20 sent to the subscriber rather than the customer 110, if the transaction involves more than a preset cost or content other than preset content. Such data may be stored in the subscriber database 128 for use by the subscriber handler 120.

Optionally, the marketing data collector handler 126 may extract data from the purchase history database 134 to aggregate and summarize data for the carrier 116 or possibly other planning uses. Further, the revenue distributor handler 124 can query the purchase history database 134 for statistics, reports, or dispute resolution. For example, disputes involving micro-payments may be handled automatically by reversing charges to a customer's account unless the purchase history database 134 contains evidence that suggest abuse of the system by the customer.

The identity of the customer 110 may be kept secret from the content provider 112 by use of temporary identification data assigned by the carrier 116 and used by the customer 110 to communicate with the content provider 112 and receive content via the communications system 114, if the content is to be provided via that system. Only the temporary identification data would be sent to the content provider 112 by the customer 110 during the request for content. The correspondence between the temporary identification data and the identity of the customer 110 would be available to the subscriber handler 120 for validation and billing purposes, but the identity of the customer 110 would not be provided to the content provider 112. The temporary identification data may be set up as part of the subscription process by the carrier 116 and may be changed periodically thereafter or may be assigned dynamically by the carrier 116 each time the customer 110 uses the device. Further, digital signatures may be used in all communications between the customer 110, the content provider 112 and the system 100. As well, private or public key encryption methods may be used to protect and verify customer identity.

The transaction validation and billing system and method described above may be implemented in a variety of ways. Those skilled in the art will understand that the above description enables the implementation of the invention using other combinations of computers and communication networks.

What is claimed is:

1. A computer method for providing real-time validation to a content provider of a customer's request transmitted via a first communications link for delivery of content by the content provider to the customer and for providing aggregated billing in a transaction, the method comprising:
   maintaining a subscriber database containing data identifying subscribers to a wireless communications system operated by a carrier;
   receiving at a transaction validation server a request from the content provider for validation of the customer's request, the content provider's request including data identifying the customer and data identifying the content including a charge for the content;
   querying the subscriber database to determine whether the data identifying the customer matches that corresponding data for a subscriber and to determine a rate plan to be applied to the transaction;
   if the data identifying the customer matches that corresponding data for a subscriber, then the transaction validation server determining the price to be charged for the content based upon the rate plan to be applied and the data identifying the content;
   the transaction validation server communicating directly with the subscriber via a second communications link and requesting acknowledgment from the subscriber of the request for the delivery of the content; and
   upon receipt of an acknowledgment from the subscriber at the transaction validation server, the transaction validation server sending to the content provider a validation of the customer's request and adding the price to be charged for the content to an aggregate of charges for the subscriber.

2. The method of claim 1, wherein the first and second communications link use a common communication system.

3. The method of claim 2, wherein the common communication system is a wireless system.

4. The method of claim 1, further comprising the step of communicating the aggregate of charges for the subscriber to a carrier or a financial institution.

5. The method of claim 1, further comprising the step of communicating the aggregate of charges for the subscriber to a carrier.

6. The method of claim 1, additionally comprising billing the aggregate of charges to the subscriber.

7. The method of claim 1, wherein the customer and the subscriber are different persons.

8. A computer system for providing real-time validation to a content provider of a customer's request transmitted via a first communications link for delivery of content by the content provider to the customer and for providing aggregated billing in a transaction, the system comprising:

a subscriber database server containing data identifying subscribers to a wireless communications system operated by a carrier;

a first communication interface for sending data to and receiving data from the content provider via a second communications link;

a second communication interface for sending data to and receiving data from the subscribers via a third communications link; and a processor for processing data received by the first communication interface requesting validation of the customer's request, the request received including customer identification data and content identification data including a charge for the content, querying the subscriber database to determine whether the customer identification data matches corresponding data for a subscriber and to determine a rate plan to be applied to the transaction;

if the customer identification data matches corresponding data for a subscriber, determining the price to be charged for the content based, upon the rate plan to be applied and the content identification data;

causing the second communication interface to send data directly to the subscriber requesting acknowledgment from the subscriber of the request for the delivery of the content, and upon receipt of an acknowledgment by the second communication interface from the subscriber, causing the first communication interface to send to the content provider a validation of the customer's request and adding the price to be charged for the content to an aggregate of charges for the subscriber.

9. The system of claim 8, wherein the processor communicates the aggregate of charges for the subscriber to a carrier or a financial institution.

10. The system of claim 8, wherein the processor communicates the aggregate of charges for the subscriber to a carrier.

11. The system of claim 8, wherein the processor bills the aggregate of charges to the subscriber.

12. The system of claim 8, wherein the customer and the subscriber are different persons.

13. The method as claimed in claim 1, wherein said acknowledgement comprises an acceptance of a charge by the subscriber.

14. The system as claimed in claim 8, wherein said acknowledgement comprises an acceptance of a charge by the subscriber.

15. The method as claimed in claim 4, wherein the financial institution comprises a charge card system or prepaid billing system.

16. The system as claimed in claim 9, wherein the financial institution comprises a charge card system or prepaid billing system.

17. The method as claimed in claim 1, wherein the data identifying the customer is temporary identification data assigned by a carrier.

18. The system as claimed in claim 8, wherein the customer identification data is temporary identification data assigned by a carrier.

19. The method as claimed in claim 1, wherein determining the price to be charged for the content is further based upon a currency exchange rate to be applied to the price.

20. The system as claimed in claim 8, wherein determining the price to be charged for the content is further based upon a currency exchange rate to be applied to the price.

21. The method as claimed in claim 1, wherein the data identifying the customer includes an identification of the wireless device used by the customer.

22. The system as claimed in claim 8, wherein the customer identification data includes an identification of the wireless device used by the customer.

\* \* \* \* \*